(12) United States Patent
Bohnert et al.

(10) Patent No.: US 6,630,658 B1
(45) Date of Patent: Oct. 7, 2003

(54) FIBER LASER PRESSURE SENSOR

(75) Inventors: Klaus Bohnert, Oberrohrdorf (CH); Hubert Brandle, Oberengstringen (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 09/623,048
(22) PCT Filed: Jan. 14, 1999
(86) PCT No.: PCT/CH99/00017
§ 371 (c)(1),
(2), (4) Date: Nov. 20, 2000
(87) PCT Pub. No.: WO99/44023
PCT Pub. Date: Sep. 2, 1999

(30) Foreign Application Priority Data

Feb. 25, 1998 (DE) .......................... 198 07 891

(51) Int. Cl.[7] ................................. G01J 1/04
(52) U.S. Cl. ..................... 250/227.14; 250/227.16; 250/227.17; 250/227.18
(58) Field of Search ................ 250/227.14, 227.11, 250/227.16, 231.1, 227.17, 227.18, 227.19; 340/555, 556, 557, 626; 356/477

(56) References Cited

U.S. PATENT DOCUMENTS

| | | | |
|---|---|---|---|
| 4,542,647 A | 9/1985 | Molnar | 175/45 |
| 4,929,050 A | 5/1990 | Wilson | 250/227.17 |
| 5,144,690 A | 9/1992 | Domash | 385/12 |
| 5,208,877 A | 5/1993 | Murphy et al. | 250/227.14 |
| 5,309,540 A | 5/1994 | Turpin et al. | 385/11 |
| 5,515,459 A | 5/1996 | Farhadiroushan | 385/11 |
| 5,564,832 A * | 10/1996 | Ball et al. | 374/161 |
| 5,841,131 A * | 11/1998 | Schroeder | 250/227.17 |

FOREIGN PATENT DOCUMENTS

| | | | |
|---|---|---|---|
| CH | 658 296 | 10/1986 | E21B/47/022 |
| DE | 34 06 096 | 10/1986 | E21B/47/024 |
| DE | 32 27 083 | 10/1993 | G08C/23/00 |
| DE | 43 22 291 | 1/1995 | G01L/1/24 |
| WO | 96/17225 | 6/1996 | G01D/5/353 |

OTHER PUBLICATIONS

Kun–Hsieh Tsai, "General Solutions for Stress–Induced Polarization in Optical Fibers," Journal of Lightwave Technology, vol. 9, No. 1, Jan. 1991, pp. 7–17.

Alan D. Kersey, et al., "Fiber Grating Sensors," Journal of Lightwave Technology, vol. 15, No. 8, Aug. 1997, pp. 1442–1463.

Wojtek J. Bock, et al., "Temperature–Hydrostatic Pressure Cross–Sensitivity Effect in Elliptical–Core, Highly Birefringent Fibers," Applied Optics, Nov. 1, 1996, vol. 35, No. 31, pp. 6267–6270.

* cited by examiner

Primary Examiner—David V. Bruce
Assistant Examiner—Courtney Thomas
(74) Attorney, Agent, or Firm—Burns, Doane, Swecker & Mathis, L.L.P.

(57) ABSTRACT

The invention relates to a frequency-coded fiber laser pressure sensor (1) which is especially suitable for measuring isotropic pressures in oil wells. The sensor principle provided for in the invention is based on the fact that in a fiber laser (2) doped with $Er^{3+}$ a monomode or bimodal sensor fiber (5, 5a, 5b) is positioned whose pressure-related birefraction results in a frequency shift and beat frequencies between the orthogonal linear polarisation modes x, y or the spatial modes $LP_{01}$ and $LP_{11}^{straight}$ line. The beat frequencies are easily measured using a frequency counter (19). Temperature-related variations in birefraction are compensated in a differential arrangement of two sensor fiber segments (5a, 5b). Fiber-integrated Bragg gratings (4a, 4b) with low bandwidths (0.2 nm) are especially suitable as laser end reflectors. The pressure sensor (1) is characterized by a large measurement range (100 Mpa) and a high triggering capacity , (kPa), is readily multiplexed and can be housed in a very compact, light-weight and robust pressure-resistant housing (25).

17 Claims, 11 Drawing Sheets

FIBER LASER PRESSURE SENSOR

The invention relates to the field of optical pressure measurement. It proceeds from a fiber-optic laser as claimed in the preamble of claims 1 and 12.

It is necessary in crude oil production for bore holes to be monitored with regard to pressure and temperature. In the bore hole, the liquid pressures can be up to 100 MPa (1000 bar), and the temperatures can be up to over 200° C. Electric sensors such as, for example, piezoelectric resistors, piezoelectric elements, capacitive probes or crystal resonators, are frequently used for pressure measurement up to approximately 170° C. Also known is the use of optical pressure sensors which are distinguished by good high-temperature capability, corrosion resistance and electromagnetic insensitivity. Examples of this are mechanical resonators which are activated optically and read out optically, elastooptic sensors, optical sensors which a pressure-sensitive diaphragm, or Fabry-Perot resonators.

Polarimetric fiber laser sensors are disclosed, for example, in the article by H. K. Kim et al., "Polarimetric fiber laser sensors", Optics Letters 18 (4), pages 317 to 319 (1993). One or more longitudinal modes are caused to lase in an Nd-doped fiber with a round core and dichroically mirrored ends which are transparent to pumped light. Birefringence is produced in the fiber by unidirectional lateral pressure, and a frequency shift is induced between the orthogonal natural polarizations of the longitudinal modes. In the outcoupled beam, the natural polarizations are brought to interference by a linear analyzer, and the resulting beat signal is detected with the aid of a photodiode. The beat frequency can be measured very easily using a frequency counter. It represents a high-precision measure of the unidirectional pressure on the fiber laser. Hydrostatic pressures can, however, not be measured in this arrangement.

A strain sensor of similar design is presented in the article by G. A. Ball et al., "Polarimetric heterodyning Bragg—grating fiber—laser sensor", Optics Letters 18 (22), pages 1976 to 1978. Instead of the two mirrors, two Bragg gratings written directly into the fiber core are used to bound the laser cavity. Because of the small cavity length of 2.5 cm and the weak ellipticity of the fiber core, exactly two orthogonally polarized longitudinal modes can be excited using a relatively low, effectively measurable beat frequency. It is possible to use such a fiber laser sensor to measure each variable quantity which effects variation in the length or birefringence of the laser cavity. Absolute measurements, for example of a pressure, are, however, difficult or impossible, since temperature fluctuations, changes in optical parameters owing to material fatigue and the like can arbitrarily displace the operating point, that is to say the beat frequency in the unloaded state.

In the publication by J. P. Dakin et al., "Compensated polarimetric sensor using polarisation—maintaining fibre in a differential configuration", Electronic Letters 20 (1), pages 51 to 53 (1983), a passive fiber-optic sensor is indicated which comprises two identical segments, twisted by 90° and spliced together, of a polarization-maintaining fiber. One segment is subjected to the measured variable, for example temperature, strain or acoustic waves, and both segments are subjected to the isotropic noise quantity, for example all-round pressure or temperature. This differential arrangement is also particularly effectively compatible with low-coherence semiconductor lasers, because the intensity noise caused by phase noise of the light source is largely compensated. The detection of the interterometric, periodic signal is, however, substantially more complicated than the detection of frequency-coded signals of active fiber laser sensors.

Serial multiplexing of passive fiber Bragg grating sensors is disclosed, for example, in U.S. Pat. No. 4,761,073. A plurality of Bragg gratings with different reflection wavelengths are written in along a sensor fiber. The strains at the locations of the Bragg gratings can be determined by measuring the shifts in the reflection wavelengths. Thermally induced grating strains can be eliminated with the aid of superimposed gratings of different reflection wavelengths. It is also known to be possible to determine the location by time-resolved measurements with the aid of a pulsed light source instead of by wavelength-selective measurements. The measuring range is limited because of the risk of fiber fracture when measuring strain with the aid of Bragg gratings. Moreover, Bragg gratings are largely unsuitable or extremely insensitive for measuring hydrostatic or isotropic pressures.

In the article entitled "Perturbation Effects on Mode Propagation in highly Elliptical Core Two-Mode Fibers" by S,-Y. Huang et al., it is shown that a phase shift can be produced both between the polarization modes and between the spatial modes in a polarization-maintaining double-mode fiber by means of homogeneous, all-round or radial pressure, but also by axial strain, twisting and temperature.

The object of the present invention is to specify a fiber laser sensor which is suitable for frequency-coded measurement of isotropic pressures, strains or temperatures, and is distinguished by a large measuring range, a simple design and simple multiplexing capability. This object is achieved according to the invention by means of the features of claims 1 and 12.

Specifically, the core of the invention is to arrange in the laser cavity of a fiber laser, in addition to a doped fiber acting as laser medium, a sensor fiber with a non-rotationally symmetrical structure in which all-round pressure can be used to induce birefringence and a pressure-proportional beat frequency between different polarization modes or spatial modes.

An exemplary embodiment shows the optical design of a fiber laser pressure sensor with a temperature-compensated sensor fiber which consists of two fiber segments twisted relative to one another by 90°. In differential operation, both segments are subjected to the noise quantity, for example the temperature, and only one segment is subjected to the measured variable, for example the pressure.

A further exemplary embodiment represents a serial arrangement of a plurality of fiber laser pressure sensors with different emission wavelengths, which are fed via a common pumped light source, and whose pressure-proportional beat frequencies are detected in a wavelength-selective fashion.

Other exemplary embodiments relate to pressure housings for fiber lasers, in the case of which the laser-amplifying fiber and a sensor fiber segment are positioned in a capillary or chamber under low-pressure gas or a vacuum, and a sensor fiber segment is in pressure contact with the medium to be measured.

Additional exemplary embodiments follow from combination of features essential to the invention, and from the dependent claims.

An important advantage of the fiber laser pressure sensor according to the invention consists in that the frequency-coded pressure signal renders it possible to achieve a high measuring accuracy, a large pressure measuring range up to 100 MPa, and effective calibratability to absolute pressures.

A substantial advantage of the fiber laser pressure sensor also consists in that the parameters of the amplifier fiber and sensor fiber can be optimized independently of one another.

In particular, it is possible to use commercially available, erbium-doped amplifier fibers and double-mode sensor fibers with an elliptical core.

A further advantage of the fiber laser pressure sensor consists in that the temperature sensitivity is largely repressed by the differential design of a sensor fiber, and in addition the temperature can be determined from the Bragg wavelength and, as a result, the reliability of (quasi-)static pressure measurements is greatly improved.

Finally, the compact and robust design, as a result of which the fiber laser pressure sensor is outstandingly suitable for use under high pressures and temperatures and, in particular, for pressure measurement in crude oil drill holes, is very advantageous.

The invention is explained below with the aid of exemplary embodiments. In the drawing.

Identical parts are provided in the figures with identical reference symbols.

Figure 1A:
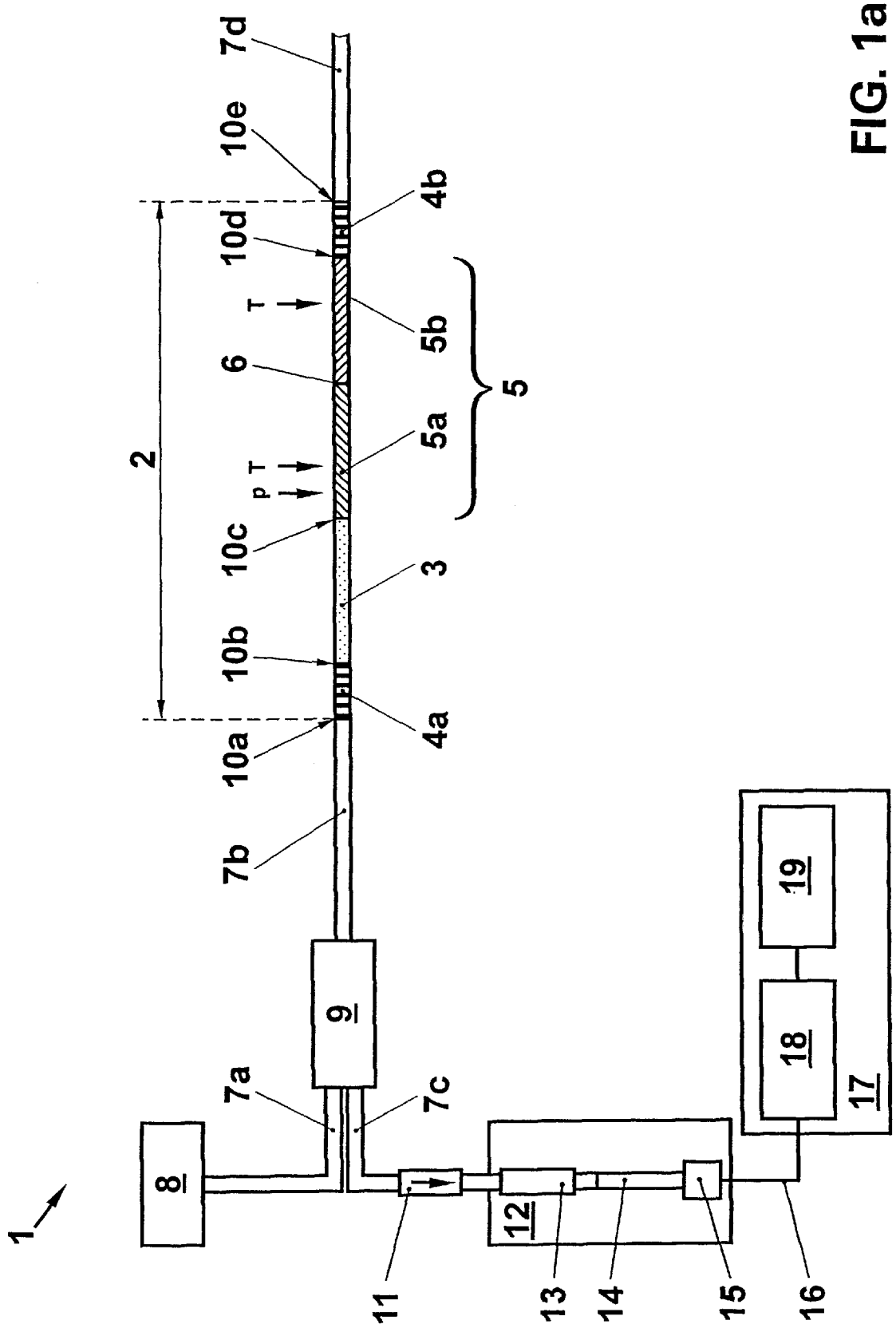
FIG. 1 shows a) an optical design of a fiber laser pressure sensor with a temperature-compensated polarimetric sensor fiber and active polarization control; b) examples of non-rotationally symmetrical sensor fibers.

FIG. 1a shows an exemplary embodiment of a fiber laser pressure sensor 1 which is suitable, in particular, for pressure measurement in crude oil drill holes. The sensor 1 comprises a pumped light source 8, feed fibers 7a–7d, a fiber laser 2 which has a laser-amplifying fiber 3 and at least two end reflectors 4a, 4b, a detection unit 12 and an electronic evaluation system 17. Arranged between the end reflectors 4a, 4b is a sensor fiber 5, 5a, 5b with a structure which is not rotationally symmetrical with reference to the fiber longitudinal axis. The sensor fiber 5, 5a, 5b preferably has an elliptical core and is subjected directly as a whole or partially to a pressure to be measured, in particular to a radially acting hydrostatic pressure. In general, the sensor fiber 5 can be designed in one piece or, for an inherent temperature compensation, in two pieces 5a, 5b. The end reflectors 4a, 4b can be implemented in a simple way as fiber Bragg gratings 4a, 4b. In the reflection configuration illustrated, the pumped light source 8, the fiber laser 2 and the detection unit 12 are optically connected by means of a preferably wavelength-selective fiber coupler 9. The detection unit 12 comprises an analyzer 14, a detector 15 and, in particular, an active polarization controller 13. The detector 15 is connected via a signal line 16 to the electronic evaluation system 17 which, for its part, has a frequency filter 18 and a frequency counter 19. The fibers 3, 4a, 4b, 5a, 5b are typically interconnected and connected to the feed fibers 7b, 7d by splices 10a–10f, and form a mechanically stable design. An optical isolator 11 between the fiber coupler 9 and the detection unit 12 is useful for suppressing retroreflections into the fiber laser 2.

Figure 1B:
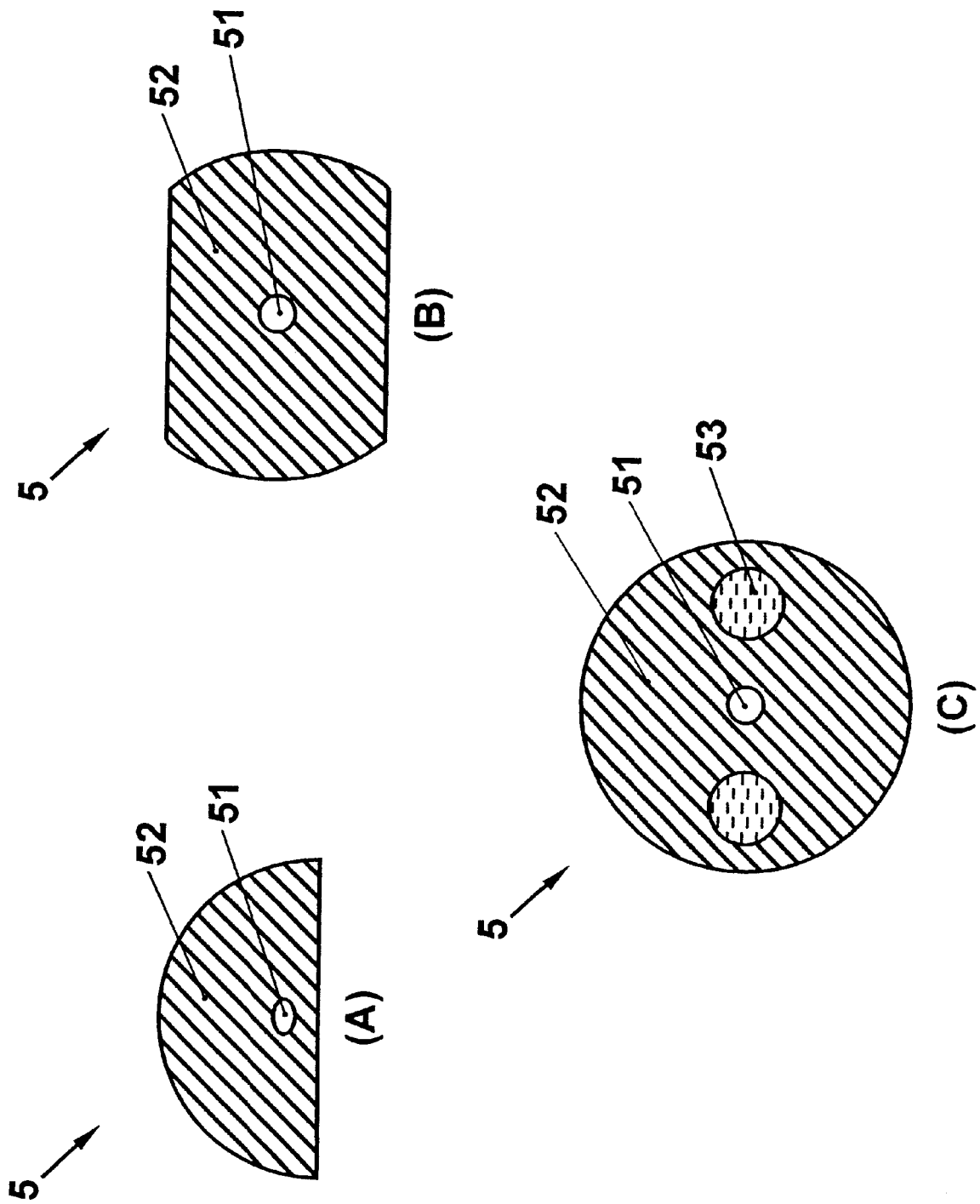
Figure 4:
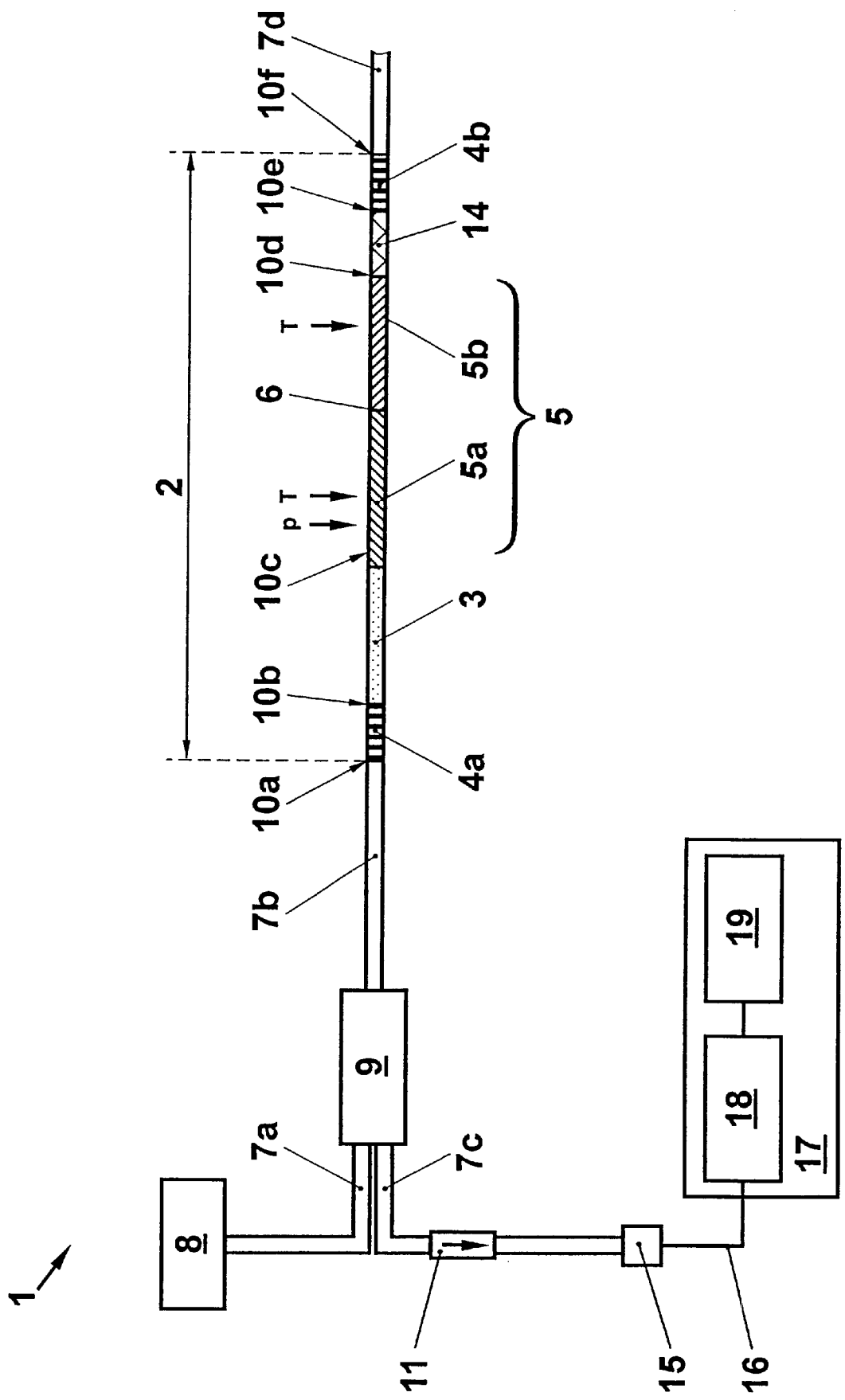
FIG. 4 shows an optical design of a fiber laser pressure sensor with a temperature-compensated double-mode sensor fiber and fiber polarizer.

The sensor fiber 5, 5a, 5b is intended to carry a plurality of, preferably two, polarization modes or spatial modes between which a differential phase shift can be induced by means of pressure-dependent birefringence. Consequently, the sensor fiber 5, 5a, 5b is advantageously a monomode fiber (FIG. 1) acting as a polarimeter or, with particular preference, a two-mode fiber (FIG. 4). Birefringent fibers, in particular strongly birefringent or polarization-maintaining fibers, are well suited as rotationally asymmetric sensor fibers 5, 5a, 5b. Polarization-maintaining fibers with an elliptical core can be used as two-mode fibers. In addition to fibers with an elliptical core (shape-induced birefringence), those having a bow-tie structure, panda structure or an elliptical inner or outer cladding (stress-induced birefringence) are also customary. These types are illustrated in the article by X.-H. Tsai et al., "General Solutions for Stress-Induced Polarization in Optical Fibers", Journal of Lightwave Technology, Vol. 9, No. 1, 1991. Fibers with shape-induced birefringence cause by far the smallest temperature-induced phase shifts. As further examples of birefringent sensor fibers 5, 5a, 5b, FIG. 1b shows a fiber. (A) with an elliptical or round core 51 and buffed cladding 52 ("D-shape" structure) and a fiber (C) with a round core 51, round cladding 52 and side holes 53 ("side-hole" structure). A particular feature is represented by the birefringence-free fiber (B) with a round core 51 and a partially buffed, rotationally asymmetric cladding 52. The cladding 52 can be buffed on one side, two sides or a plurality of sides, with the result that isotropic pressure cancels the degeneration of the polarization modes, and the desired birefringence is induced.

A substantial problem for the measuring accuracy of a fiber laser pressure sensor 1 consists in that the birefringence of sensor fibers 5, 5a, 5b is frequently temperature-dependent. An advantageous exception is represented by the fiber (B). In the case of a polarimetric pressure sensor 1, a far-reaching temperature insensitivity can be realized by means of the design of the sensor fiber 5a, 5b in accordance with FIG. 1a, which is differential in accordance with the invention. The sensor fiber 5a, 5b consists of exactly two fiber segments 5a, 5b, which are at least largely identical with regard to their fiber parameters, in particular the magnitude and temperature dependence of the birefringence, and to their length, and which are twisted by 90° relative to one another and are preferably optically interconnected via a splice 6. The 90° angle of rotation should be observed with an accuracy of ±30°, in particular ±10°. However, temperature-independent beat signals are obtained even with angles of rotation deviating from 0°. When the noise quantity (temperature) acts on both segments 5a, 5b, and the measured variable (pressure) acts only on one segment 5a or 5b, the interference effects are exactly compensated and the measured variable is extracted. Of course, it is also possible for a plurality of measuring and/or reference fiber segments 5a, 5b to be present. An essential advantage of this arrangement is the good absolute calibratability of the pressure signal, since the beat frequency 0 ideally corresponds to the pressure 0 at arbitrary temperatures. Again, a static reference pressure, which acts on the reference fiber segment 5a; 5b shielded from the medium 30 can be prescribed such that the beat frequency is reduced by a desired additive value. When the fiber segments 5a, 5b have different fiber parameters (core size, ellipticity, index jump, etc.), their lengths are to be selected such that the phase shifts produced by temperature-dependent birefringence are largely equal. The degeneration of the natural frequencies in the case of vanishing pressure is then generally eliminated.

In the case of a two-mode sensor fiber (FIG. 4), the segments 5a, 5b are to be orientated in parallel at 0° or orthogonally at 90° to one another. The angular ranges are once again to be preferably ±30°, in particular ±10°. The parallel orientation has the advantage that it is possible to achieve compensation of temperature-induced phase shifts precisely in the case of identical lengths of segments 5a, 5b of the same fiber type. Temperature-independent beat signals occur, however, even with angles of rotation deviating from 90°. The splices 10c, 6 and 10d are transversely displaced, such that both the spatial modes $LP_{01}$ and $LP_{11}^{rectilinear}$ are excited in the first segment 5a, the two spatial modes are cross-coupled upon transition into the segment 5b, and the interference of the two spatial modes is coupled into the feed fiber 7d or 7b. In the event of pressure on a fiber segment 5a; 5b, the birefringence between the spatial modes is modified in order to induce a phase shift, and frequency detuning and beat frequencies between the spatial modes are generated in the fiber laser. Again, a temperature-compensated pressure measurement can be realized on the basis of the differential arrangement of the fiber segments 5a, 5b. As an alternative to this, a purely passive, temperature compensation with a one-piece sensor fiber 5 is also possible. In the case of two-mode fibers, to be precise, there exists a characteristic wavelength $\lambda_0$ at which the group velocities of the two spatial modes $LP_{01}$ and $LP_{11}^{rectilinear}$ are equal, and no temperature-induced phase shifts occur between the modes. A largely temperature-compensated fiber laser pressure sensor 1 can thus be realized by virtue of the fact that the emission wavelength, that is to say the Bragg wavelength $\lambda_B$ of the fiber Bragg gratings 4a, 4b, is selected in the spectral region of a vanishing birefringence of the group refractive index of the sensor fiber 5, 5a, 5b.

As a supplement or alternative to passive temperature compensation arrangements, it is possible both in the case of polarimetric and in the case of two-mode sensor fibers 5, 5a, 5b to carry out an active temperature measurement and pressure signal correction, for example by using the Bragg wavelength $(\lambda_B)$ as a measure of the temperature. For example, an additional fiber coupler with an optical wavelength meter (not illustrated) can be provided between the isolator 11 and the polarization controller 13, and the absolute temperature of the fiber laser 2 can be determined with the aid of a calibrated wavelength measurement.

Figure 2A:
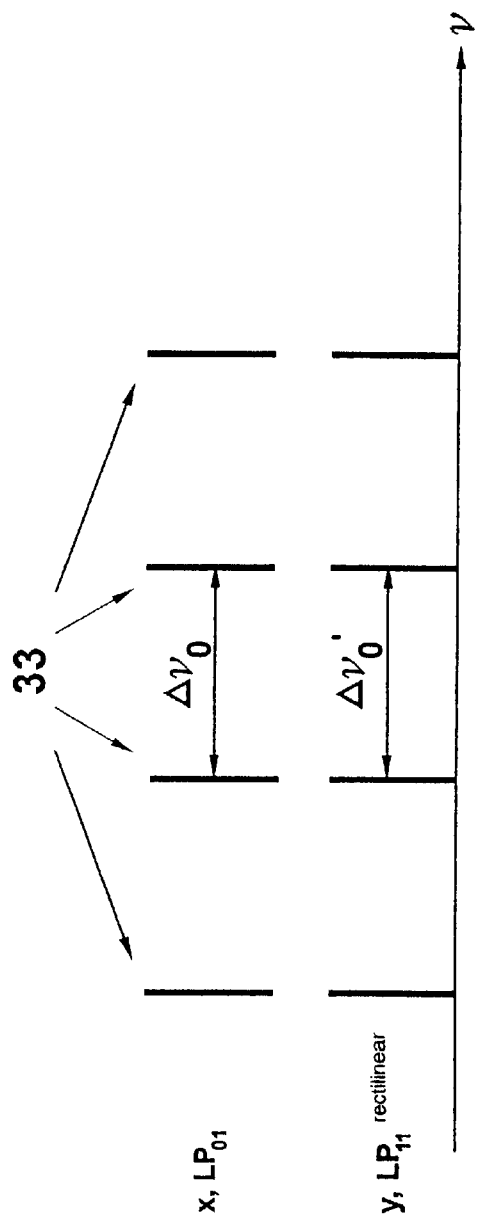
FIG. 2 shows a), b) frequency shifting of longitudinal modes owing to pressure-induced or temperature-induced birefringence in the sensor fiber; c) longitudinal modes of the fiber laser and reflection spectra of fiber Bragg grating end reflectors.
Figure 2B:
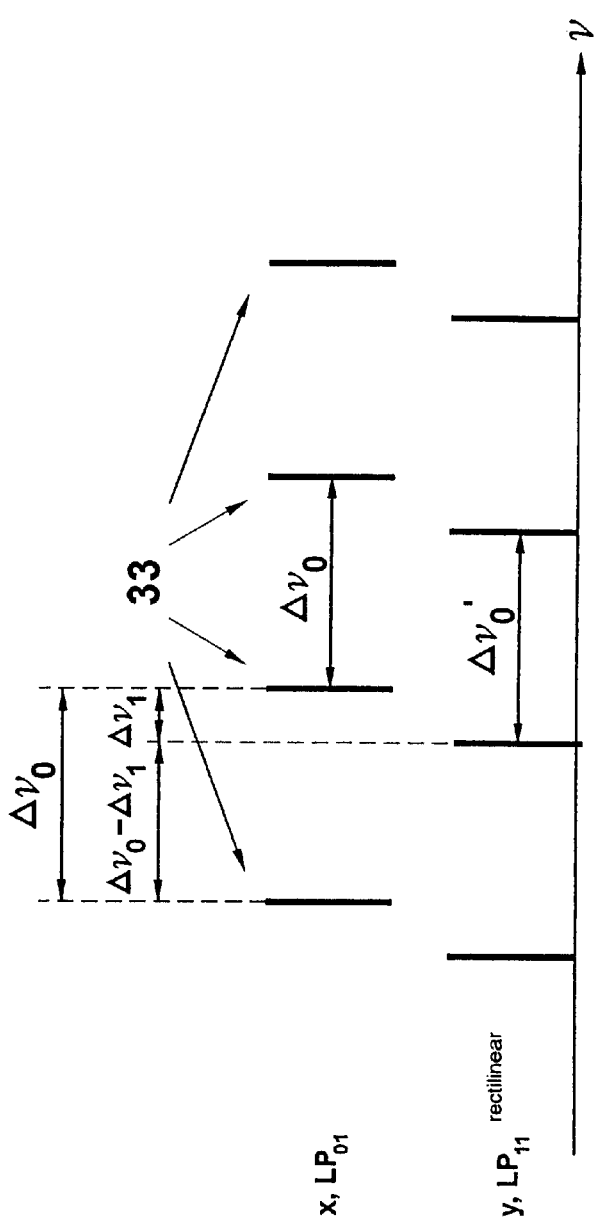

With the aid of FIG. 2, the mode of operation of the fiber laser 2 and of a two-piece sensor fiber 5, 5a, 5b is to be explained in more detail. The fiber laser 2 represents a laser cavity with longitudinal modes 33 (FIGS. 2a, 2b). Its natural frequencies are characterized by the fact that the optical length of the fiber laser 2 is filled up by integral multiples of half the laser wavelength. The frequency spacing $\Delta v_0$ between adjacent longitudinal modes 33 is equidistant, neglecting dispersion effects, and amounts for a polarization mode x, y or spatial mode $LP_{01}$, $LP_{11}^{rectilinear}$ coupled into the first sensor fiber segment 5a to $$\Delta v_0 = c/[2 \cdot (n_d L_d + n_a L_a + n_b L_b)], \quad (G1)$$

where c=speed of light in vacuum; $n_d$=effective refractive index of the doped fiber 3; $L_d$=length of the doped fiber; $n_a$, $n_b$=effective refractive index of the coupled-in mode in the two sensor fiber segments 5a, 5b and $L_a$, $L_b$=lengths of the sensor fiber segments 5a, 5b. The result for the orthogonal coupled-in mode of the second spatial mode is a frequency spacing $\Delta v_0'$ as in (G1) with the associated refractive indices $n_a'$, $n_b'$. In order to simplify the calculation, but without limitation of generality, it is assumed that both sensor fiber segments 4a, 4b are of the same type and equal length, it therefore holding that: $n_a' = n_b$, $n_b' = n_a$, $L_a = L_b$ and $$\Delta v_0' = \Delta v_0 = c/[2 \cdot (n_d L_d + (n_a + n_b) \cdot L)]. \quad (G2)$$

Without pressure on the sensor fiber 5a, 5b, the birefringences $\Delta n_a = n_A - n_a'$ and $\Delta n_b = n_b - n_b'$ in the segments 5a and 5b are then equal and opposite, and the frequencies of the two modes are degenerate. If a pressure is exercised, for example, on the segment 5a, the birefringence $\Delta n_a$ and the phase shift $\Phi = (2 \cdot \pi/\lambda) \cdot L \cdot \Delta n_a$ change in proportion to the pressure:

$$\Delta \Phi = K_p \cdot p \cdot L \text{ with} \quad (G4)$$

$$K_p = 2 \cdot \pi/\lambda \cdot [\partial (\Delta n_a)/\partial_p + (\Delta n_a/L) \cdot \partial L/\partial_p], \quad (G5)$$

where $\Delta \Phi$=induced phase shift, $K_p$=proportionality constant, p=pressure and $\lambda$=wavelength of the fiber laser 2. This expression is valid in first order and does not take account of dependencies of higher order on pressure and/or temperature. The natural frequencies of orthogonal modes of the fiber laser are displaced relative to one another by the phase shift $\Delta \Phi$. As may be seen from FIGS. 2a and 2b, this results in the beat frequencies $\Delta v_1$ and $\Delta v_0 - \Delta v_1$ and, in general, $m \cdot \Delta v_0 \pm \Delta v_1$, m=1 2, 3, .... The frequency spacings remain virtually unchanged and are, as before, approximately equidistant and equal. The maximum measurable pressure is given by the condition that the beat frequency, for example the fundamental $\Delta v_1$, is to be uniquely detectable, that is to say that $\Delta v_1 < \Delta v_0/2$ holds. This corresponds to a maximum permissible pressure-induced phase shift of $\Delta \Phi_{max} = \pi/2$.

In order to illustrate some quantitative estimations relating to the pressure measuring range and pressure resolution: commercially available polarization-maintaining fibers 5a, 5b with an elliptical core exhibit a typical hydrostatic or isotropic pressure sensitivity $K_p 0.7$ rad/(MPa·m) with $\lambda \approx 800$ nm. Because $K_p \sim 1/\lambda$), $K_p \approx 0.35$ rad/(MPa·m) with $\lambda \approx 1550$ nm. It follows that at this wavelength there is an upper bound for the product of the sensor fiber length L and pressure p $$L \cdot p < \Delta \Phi_{max}/K_p = 4.5 \text{ MPa·m}. \quad (G6)$$

For example, with a sensor fiber segment 5a of length L=4.5 cm it is possible to measure.maximum pressures up to 100 MPa (=1000 bars).

The pressure resolution is given by the ratio of linewidth to the maximum beat frequency $\Delta v_0/2$. Typical values for these variables are in the 1–10 kHz range and in the 100 MHz–1 GHz range. For example, it is possible to assume a doped fiber 3 of 25 cm, sensor fiber segments 5a, 5b of 5 cm each, and a mean effective refractive index of 1.45. In accordance with the equation (G2), the frequency spacing $\Delta v_0 = 295$ MHz and the wavelength separation between neighboring longitudinal modes is then $\Delta \lambda = \lambda^2/c \cdot \Delta v_0 = 0.0024$ nm.

Figure 2C:
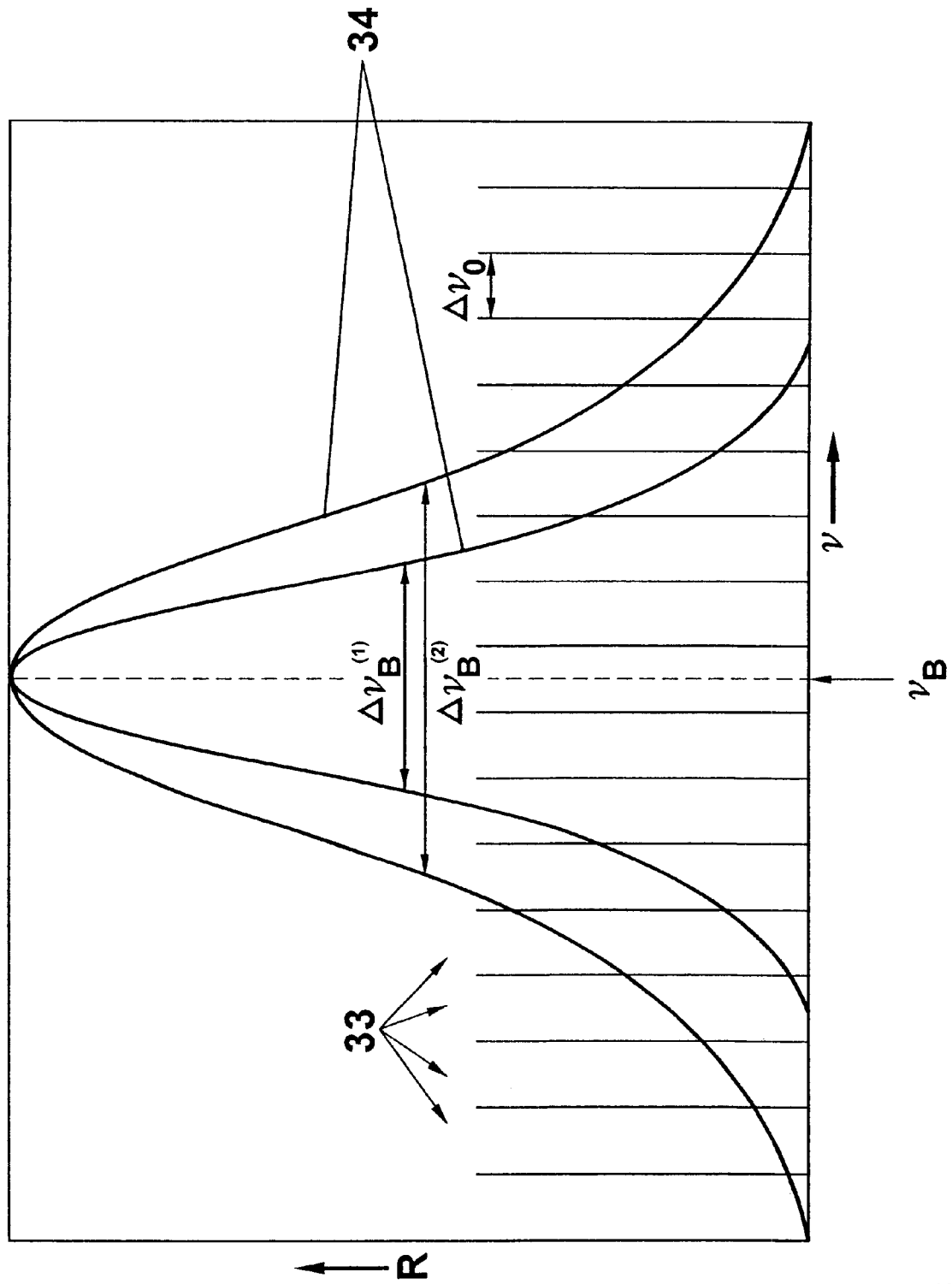

Further design criteria for designing the fiber laser 2 according to the invention and, in particular, the fiber Bragg grating 4a, 4b are explained in conjunction with FIG. 2c. The emission spectrum of the fiber laser 2 consists of the longitudinal modes 33, which are situated inside the fluorescence spectrum of the doped laser-amplifying fiber 3 and reflection spectra 34 of the fiber Bragg gratings 4a, 4b, and experience more amplification there than losses. The fiber laser 2 is advantageously optimized such that the laser threshold is low, few longitudinal modes 33 build up, and a low temperature sensitivity of the laser response results. Consequently, there is the optimization problem, for dimensioning the fiber Bragg gratings 4a, 4b, of achieving a high reflectivity R and a small spectral width or bandwidth $\Delta v_B$ and of eliminating disturbing temperature effects.

Fiber Bragg gratings 4a, 4b are available with high reflectivities up to approximately 100% and very small bandwidths down to approximately $\Delta v_B=0.2$ nm in the case of a Bragg wavelength $\lambda_B \approx 1550$ nm. The spectral position of the reflection maximum, characterized by the Bragg wavelength $\lambda_B$ or the Bragg frequency $v_B$, is displaced with temperature by typically 0.01 nm/° C. in the case of $\lambda_B=1550$ nm. It is advantageous for a low laser threshold when the reflectivity of the first fiber Bragg grating 4a is selected to be in the range 85%–99%, in particular to be equal to 90%, and that of the second fiber Bragg grating 4b is selected to be greater than 98%, in particular greater than 99%. A small number of active longitudinal modes 33 can be realized, on the one hand, by a short fiber laser length $L_d+2\cdot L$ and, on the other hand, by the selection of small spectral widths $\Delta v_B^{(1)}$, $\Delta v_b^{(2)}$ of the fiber Bragg gratings 4a, 4b. It is preferred to select the bandwidths $\Delta v_B^{(1)}$, $\Delta v_B^{(2)}<0.7$ nm, in particular $\Delta v_B^{(1)}$, $\Delta v_B^{(2)}<0.3$ nm. Limitation to a few longitudinal modes 33 counteracts line broadening of the beat frequencies by dispersion in the fiber laser 2.

The losses in the fiber laser 2 can be unduly increased by different displacements of the reflection wavelengths, for example owing to different temperatures of the fiber Bragg gratings 4a, 4b. One precautionary measure according to the invention consists in selecting both gratings with the same reflection wavelength, and one of the gratings with a larger bandwidth ($\Delta v_B^{(1)} < \Delta v_B^{(2)}$, in order to ensure complete overlapping of the reflection spectra. In particular, one bandwidth $\Delta v_B^{(1)}$ is twice, and preferably three times as large as the other $\Delta v_B^{(2)}$. It is favorable to select, for example, $\Delta v_B^{(1)}=0.6$ nm and $\Delta v_B^{(2)}=0.2$ nm.

The laser-amplifying fiber 3 is advantageously a fiber 3 which is doped with a few 100 ppm erbium ($Er^{3+}$) ions and has absorption bands at, inter alia, 1480 nm and 980 nm and an optical amplification above 1000 nm and in the spectral region 1530 nm–1570 nm. Commercial pumped laser diodes 8 are available both for 1480 nm and for 980 nm. A 1480 nm pumping laser diode is to be preferred for large distances of a few km between the pumping laser 8 and fiber laser 2 and/or in the case of many fiber lasers 2 in a multiplex arrangement, since the pumped light suffers slight losses in the feed fibers 7a–7d. Optical components for 1550 nm are also readily available. The absorption of pumped light is typically 3.3 dB/m in the case of 1480 nm or an $Er^{3+}$ doping concentration of 220 ppm. Depending on optical losses, the laser threshold is of the order of magnitude of a few mW of absorbed pumping power. The pumped light source preferably has an optical power above 100 mW. Other dopings and spectral regions can also be used. By way of example, praseodymium ($Pr^{3+}$) with emission at 1300 nm, neodymium ($Nd^{3+}$) at 1060 nm or thulium ($Tm^{3+}$) at 810 nm may be mentioned as rare earth elements. The pumping wavelength and the reflection wavelength of the fiber Bragg.gratings 4a, 4b are to be adapted correspondingly.

Figure 3:
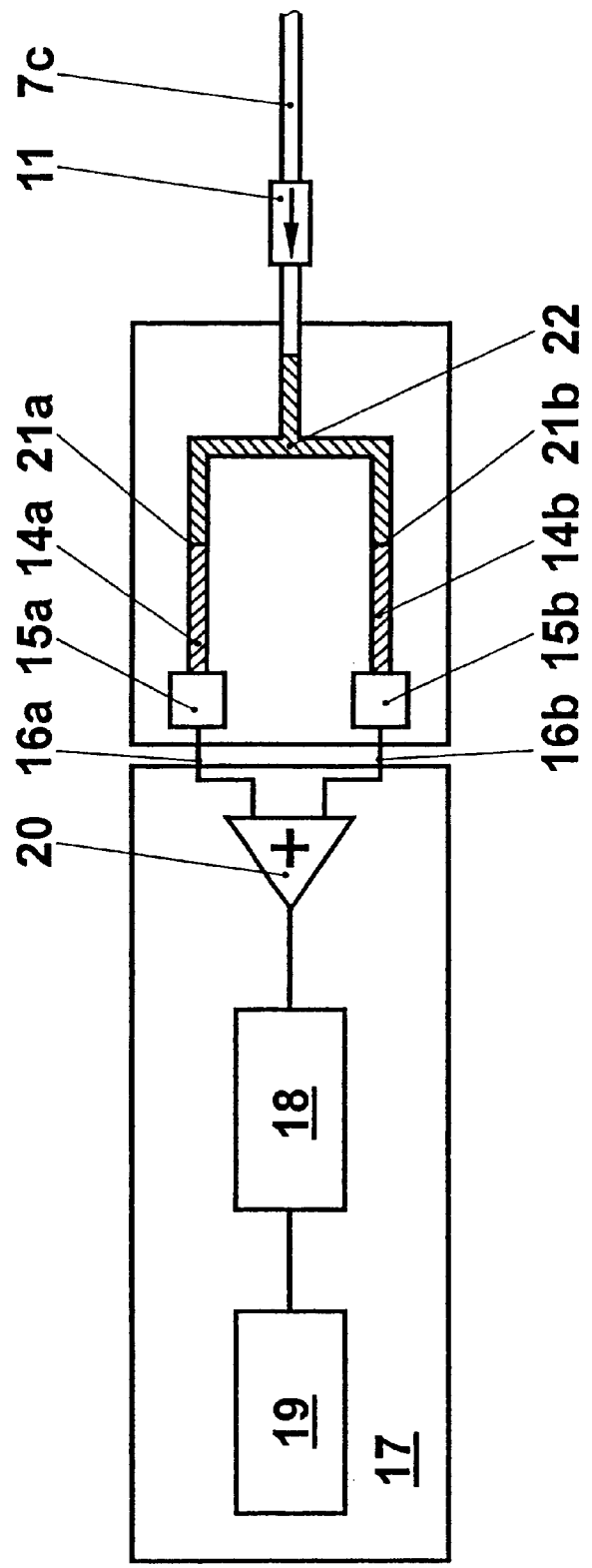
FIG. 3 shows a detection unit for a fiber laser pressure sensor in accordance with FIG. 1 without polarization controller.

FIGS. 1a and 3 show arrangements for generating and detecting the beat frequency/frequencies for polarimetric sensor fibers 5, 5a, 5b. The light emitted by the fiber laser 2 is (predominantly) coupled out on the side of the less reflective fiber Bragg grating, that is to say 4a in a reflection configuration, or 4b in a transmission configuration (not illustrated). A polarimetric reflection arrangement is assumed below. The emission light is separated from the pumped light in the fiber coupler 9 owing to the displaced wavelength. Retroreflections into the fiber laser 2 are suppressed by the preferably fiber-optic isolator 11 and by an oblique polished section of the end of the fiber 7d. The polarization modes x, y are caused to interfere in the analyzer 14 in the detection unit. The orientation angle of the analyzer 14 relative to the axes of the polarization modes x, y is between 0° and 90°, and is 45°, in particular. The analyzer 14 can be of solid optical design, or be designed more simply as a fiber polarizer 14. The interference signal is converted in the detector is into an intensity-proportional electric signal. The detector 15, typically a photodiode 15, requires for this purpose a bandwidth which is greater than the beat frequency to be measured. The desired beat signal is separated in the frequency filter 18 and fed to a frequency counter 19. Alternative embodiments of the electronic evaluation system 17 can comprise a radio-frequency spectral analyzer, an oscilloscope or other high-frequency or microwave measuring instruments.

The polarization of the two modes x, y can easily be lost in lengthy or disturbed feed fibers 7b–7d. Provided for the purpose of reconstructing the polarization is a polarization controller 13 in which a birefringence (magnitude and, if appropriate, axial orientation) compensating the disturbances is generated. As an alternative to the polarization controller 13, it is possible to use polarization-maintaining components 7b–7d, 9, 11 with the same orientation as the analyzer 14. As a further alternative, the beat signal can be generated directly outside the fiber laser 2 by a fiber polarizer 14 (not illustrated), which is orientated at an angle ±0° or 90°, in particular at 45°, to the birefringence axes of the sensor fiber 5, 5a, 5b.

FIG. 3 shows another alternative, in the case of which the detection unit 12 has a polarization-maintaining fiber coupler 22 with two analyzers 14a, 14b, orientated at 0° (±10°) and 45° (±10°), and two detectors 15a, 15b. The analyzers are preferably fiber polarizers 14a, 14b which are connected to the fiber coupler 22 via splices 21a, 21b. The electronic evaluation system 17 additionally comprises an adder 20 to whose inputs the detectors 15a, 15b are connected via signal lines 16a, 16b. A further alternative for generating interference between the polarization modes x, y consists in producing a strong coupling between the modes x, y, for example by microbending of the fiber downstream of the optical isolator 11.

FIG. 4 constitutes a strongly simplified variant to FIG. 1, in the case of which a two-mode sensor fiber 5a, 5b with an elliptical core is used instead of a single-mode one. The interference between these spatial modes $LP_{01}$ and $LP_{11}^{rectilinear}$ is formed directly at the transversely offset splice 10c. This eliminates the necessity for a polarization controller 13 and an analyzer 14 upstream of the detector 15. A fiber polarizer 14, for example with splices 10d and 10e, is advantageously inserted in or close to the fiber laser 2. The spatial modes $LP_{01}$ and $LP_{11}^{rectilinear}$ can then build up only with a linear polarization x or y, and the number of beat frequencies is halved. This sensor design is distinguished by a greatly reduced complexity and by being very well suited to multiplex arrangements in accordance with FIG. 5.

Figure 5:
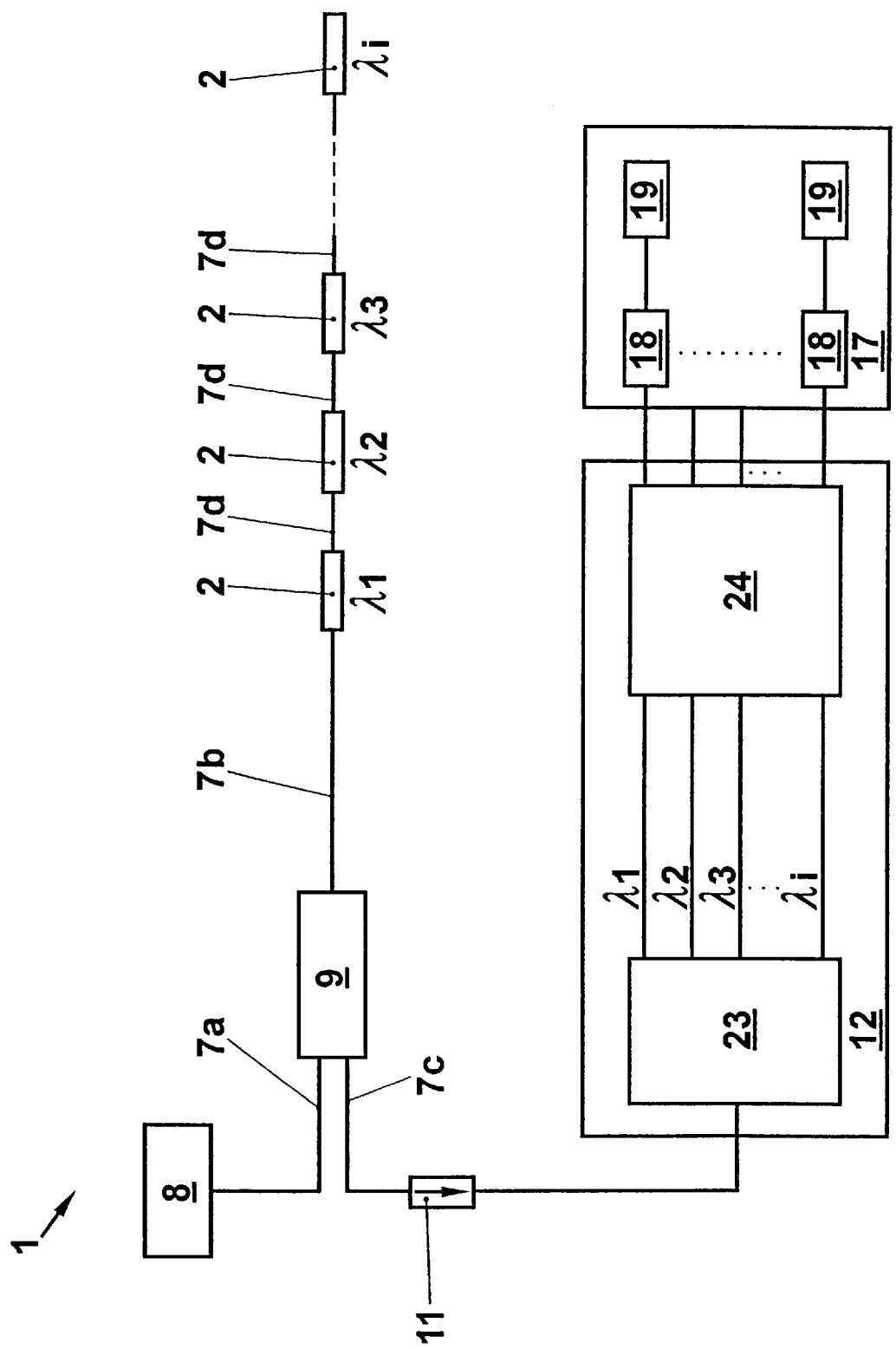
FIG. 5 shows a multiplex arrangement of fiber laser pressure sensors with different emission wavelengths ($\lambda_1, \ldots, \lambda_n$)

FIG. 5 shows a multiplex arrangement which comprises a plurality of fiber lasers 2 of different emission wavelengths $\lambda_1, \ldots, \lambda_i$. The fiber lasers 2 are optically connected to exactly one pumped light source 8 and exactly one detection unit 12. The detection unit 12 has a wavelength division demultiplexer 23 and a multichannel detector 24 which is electrically connected to a multichannel electronic evaluation system 17. A beat frequency is detected as described above in each channel. In particular, the electronic evaluation system 17 comprises for each fiber laser 2 a frequency filter 18 and a frequency counter 19. The doping concentrations and lengths of the laser-amplifying fibers 3 are selected for the serial multiplexer arrangement represented such that sufficient pumping power is absorbed in each fiber laser 2, and sufficient pumping power is transmitted for the subsequent fiber lasers 2. It is therefore very advantageous that separate amplifying fibers 3 and sensor fibers 5, 5a, 5b are provided and the laser response and the pressure sensitivity of the sensor 1 can be optimized independently of one another. The spacing between the emission wavelengths is selected to be so large that the reflection spectra of all the fiber lasers 2 remain free from overlap even in the case of temperature differences, and spectral separation of the signals in the demultiplexer 23 is possible. Consequently, each fiber laser 2 requires a wavelength window of at least 2.4 nm for a temperature range between 0° C. and 230° C. The multiplex arrangement can also be designed in parallel or in the manner of a network. For example, the pumped light can also be led next to the fiber lasers 2 and be fed to the latter individually via fiber couplers. The directions of propagation of pumped light and laser emission are permitted to be the same. An advantage of a wavelength division multiplexing arrangement is that the fundamental design, in particular the reflection configuration with a fiber coupler 9 selecting the pumping wavelength, can be preserved, and the channel separation can be carried out simply with the aid of the optical wavelength division demultiplexer 23.

FIGS. 6–9 show exemplary embodiments relating to pressure housings 25 with temperature-compensated sensor fiber segments 5a, 5b. The idea consists in shielding the end reflectors 4a, 4b, the laser-amplifying fiber 3 and the reference fiber segment 5a or 5b, and subjecting only the measuring fiber segment 5b or 5a to the pressure p of the medium 30 which is to be measured. Furthermore, a small, slim, mechanically and thermally stable sensor design 2 is welcome.

The solution according to the invention consists in that the fiber laser 2 is mounted in a pressure-resistant housing 25 with a plurality of pressure chambers 27a–27c and pressure-tight fiber feedthroughs 28a–28d, and a first pressure chamber 27c, which contains a measuring fiber segment 5a; 5b of the sensor fiber 5, is in direct pressure exchange with the surrounding medium 30. The feedthroughs 28a–28d create a fiber-optic connection between the pressure chambers 27a–27c and the outside. The housing 25 preferably has three pressure chambers 27a–27c, an elongated, in particular cylindrical, shape, a length corresponding essentially to the fiber laser 2, and a diameter of at most 10 mm. The housing 25, in particular the pressure chamber 27c, preferably has an opening 26 for exchanging pressure, which is provided with a pressure diaphragm 32 and contains a fluid 31, for example silicone oil. In this way, the surrounding pressure p is transmitted all around onto the measuring fiber segment 5a; 5b, and protects the latter against direct contact with the medium 30.

Figure 6:
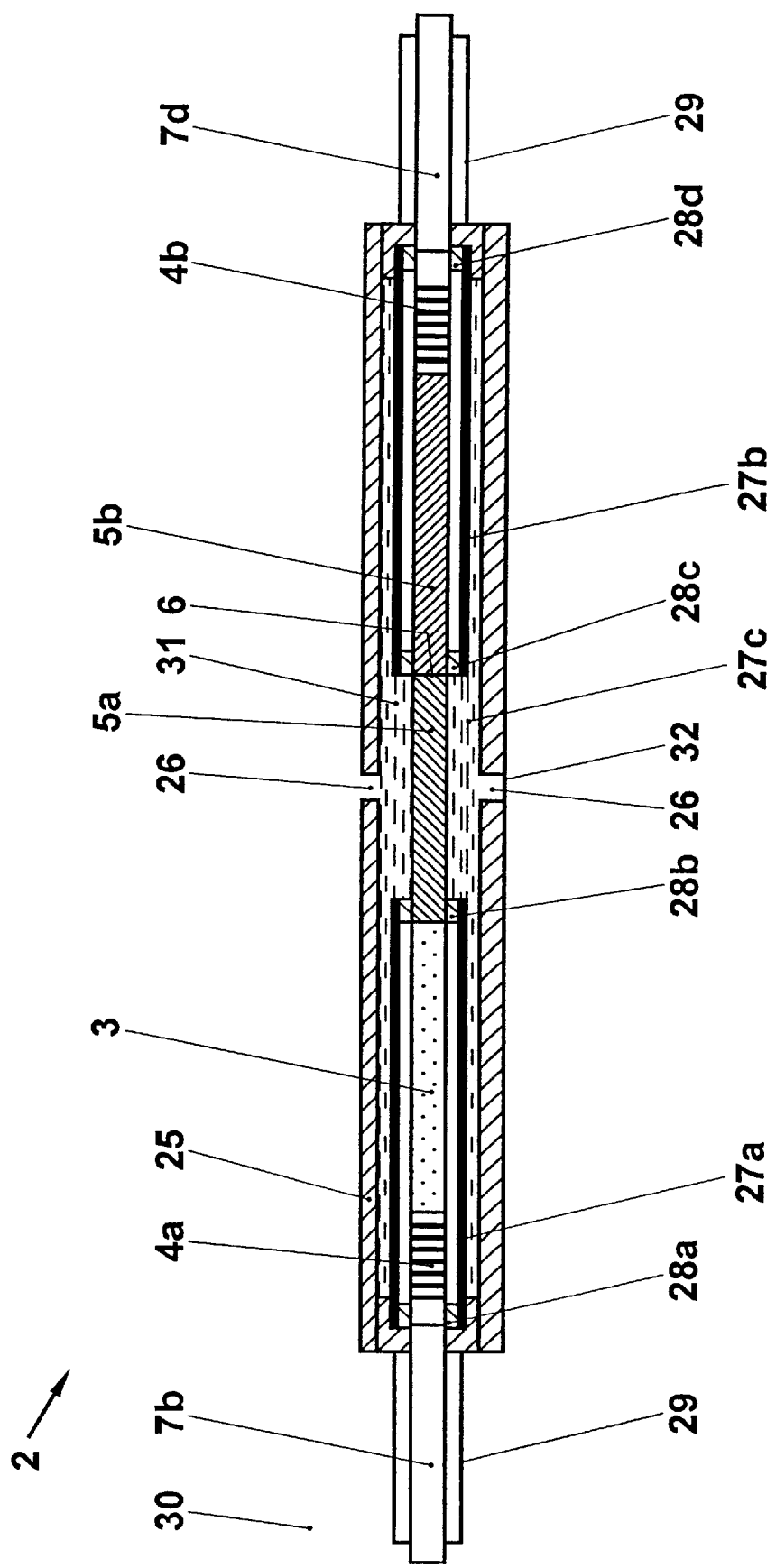
FIGS. 6–9 show different pressure housings for a fiber laser with an elongated sensor fiber.
Figure 7:
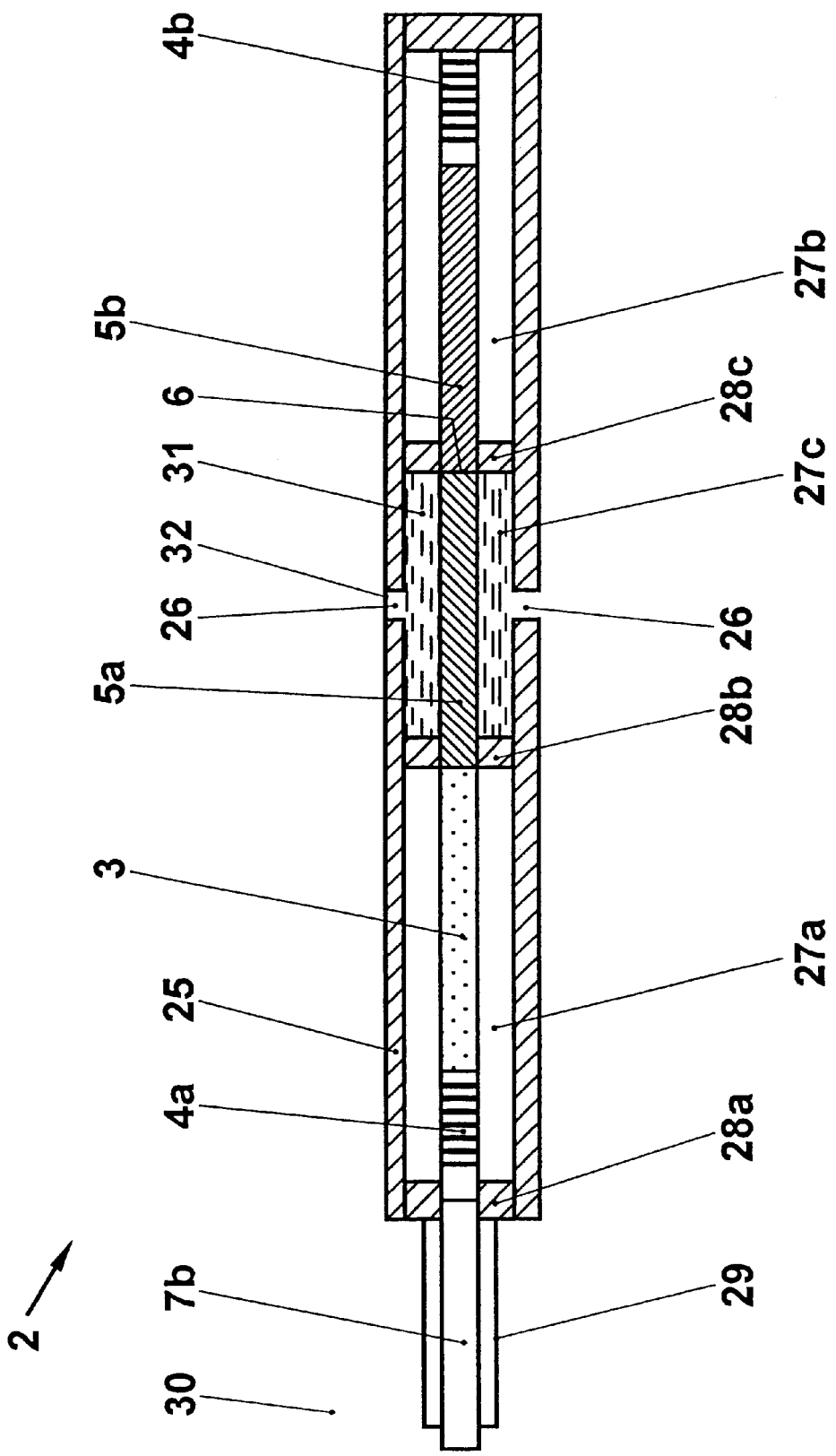
Figure 8:
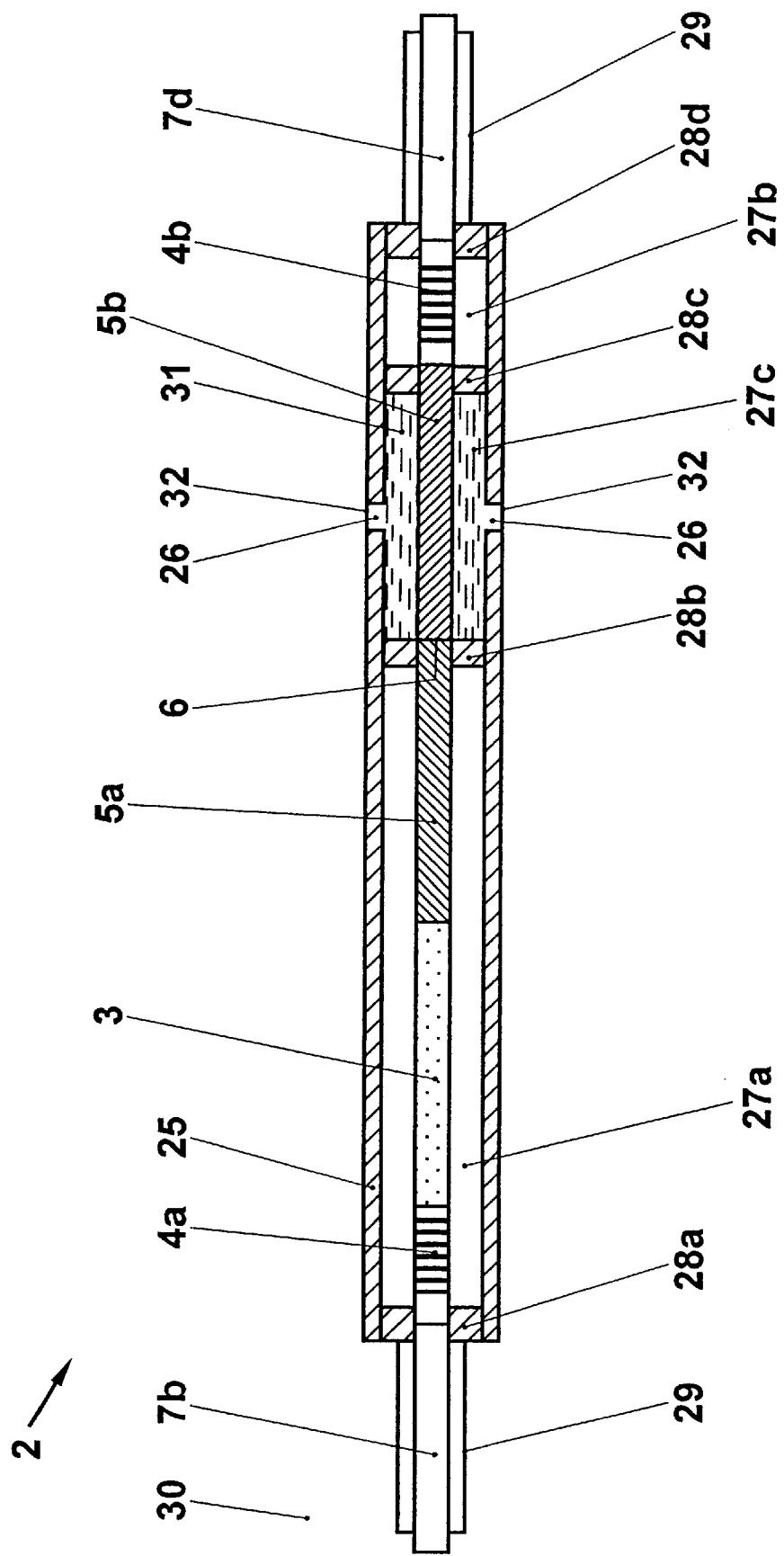

In detail, FIGS. 6–9 show that a fiber Bragg grating 4a and the laser-amplifying fiber 3 are mounted in a second pressure chamber 27a, and a fiber Bragg grating 4b and a fiber segment 5b of the sensor fiber are mounted in a third pressure chamber 27b. The second and third pressure chambers 27a, 27b are preferably evacuated, under low-pressure gas or under normal pressure. They can also be implemented as inner capillaries 27a, 27b (FIG. 6) or as housing compartments (FIG. 7). It is favorable for the inner capillaries 27a, 27b to be cylindrical and consist of corrosion-resistant steel or quartz glass which has a coefficient of thermal expansion matched optimally to the fibers 3, 4a, 4b, 5a, 5b. The fibers 3, 4a, 4b, 5a, 5b are fastened without stress in the pressure chambers 27a–27c, in order to avoid fiber strains owing to thermal or mechanical loads on the housing 25. In the case of an individual fiber laser 2, or of the last in a multiplex arrangement, the feed fiber 7d and fiber feedthrough 28d are eliminated, and the fiber can terminate with the fiber Bragg grating 4b inside the housing 25 (FIG. 7). Instead of the first fiber segment 5a, it is also possible for the second 5b to be subjected to the ambient pressure p (FIG. 8).

Figure 9:
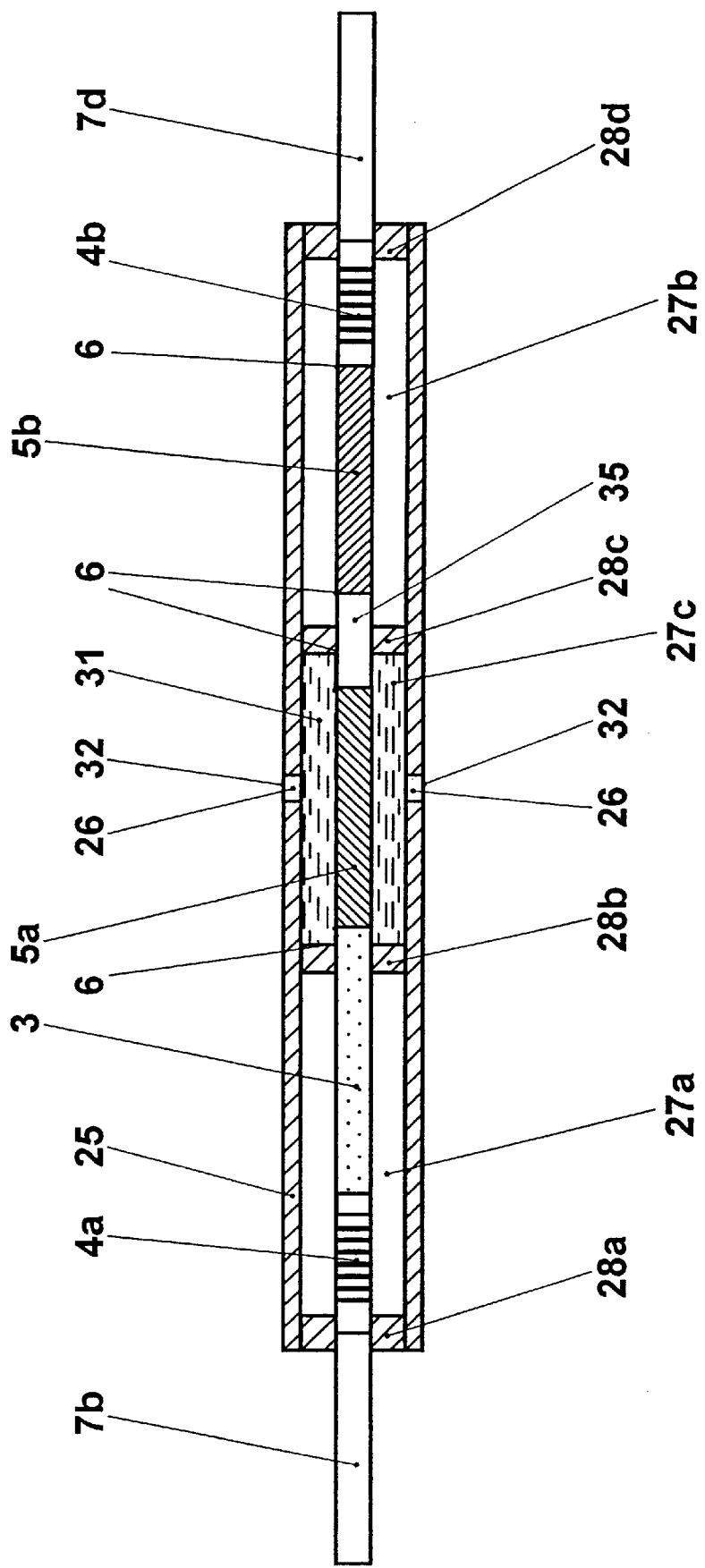

Furthermore, a one-mode intermediate fiber 35 can be arranged in the region of the pressure-tight fiber feedthrough 28c between fiber segments 5a, 5b (FIG. 9). The intermediate fiber 35 serves the purpose of absorbing the force of the fiber feedthrough 28c and of permitting the sensor fibers 5a, 5b to be held largely without force. The intermediate fiber 35 preferably has an elliptical core which ensures a fixed axial orientation, largely independent of force, of the birefringence. The orthogonal modes x, y or $LP_{01}$, $LO_{11}^{reactilinear}$ of the sensor fibers 5a, 5b are intended to be transmitted in the intermediate fiber 35 by means of the same modes or, preferably, the same mode, in order inherently to compensate pressure-induced phase shifts in the intermediate fiber 35. The core ellipse of the intermediate fiber 35 is therefore intended to be at 45° (±10°), in the case of polarimetric monomode sensor fibers 5a, 5b, and parallel or orthogonal (±10°), in the case of spatial two-mode sensor fibers 5a, 5b, to the axes of the segments 5a, 5b. In the latter case, the additional splices 6 are offset transversely, in order for the two spatial modes of the segments 5a, 5b to be coupled in and out as uniformly as possible. The orthogonal modes are cross-coupled only partially, and additional, temperature-dependent beat frequencies occur. The effectiveness of the passive temperature compensation is thereby ensured.

The pressure housing 25 according to the invention for the fiber laser pressure sensor 1 has a plurality of advantages. The housing 25 is distinguished by compactness, low weight and large mechanical and thermal loadability. With its thin, elongated shape, it is optimally adapted to an optical fiber and very well suited for use in large fiber links 7a–7d with many pressure measuring points, in particular in oil drill holes. It is possible to mount in the housing 25 without difficulty fibers 3, 4a, 4b, 5a, 5b which have a high-temperature-resistant fiber cladding, for example made from polyimides or metal, and/or a fiber cable 29. It is also possible to implement special fiber claddings for matching the acoustic impedance between sensor fiber 5, 5a, 5b and the medium 30 or fluid 31, for example for (ultrasound detectors in a simple way.

The sequence of the fibers 3, 5a, 5b in the fiber laser is generally arbitrary. In particular, the doped fiber can also be arranged at the rear end of the fiber laser 2 or between the two sensor fiber segments 5a, 5b. The sensor fibers 5a, 5b can also consist of a polarimetric monomode fiber 5a and a two-mode fiber 5b. A polarimetric pressure measurement and a two-mode fiber temperature measurement are then possible, for example, or vice versa. In the case of a single-piece sensor fiber 5, the fiber segment 5a or 5b protected from the ambient temperature p is respectively eliminated, and the pressure housings 25 from FIGS. 6–8 are correspondingly simplified. In general, the fiber Bragg gratings 4a, 4b can be written directly into the doped laser-amplifying fiber 3 and/or into the sensor fiber 5, 5b. For particularly compact fiber laser pressure sensors 2, it is also possible for the laser-amplifying fiber 3 and the sensor fiber 5, 5a, 5b to be identical, that is to say the sensor fiber 5, 5a, 5b is doped with rare earth ions and acts simultaneously as a laser-amplifying fiber 3. Both the maximum measurable pressure and, approximately, the laser threshold are then inversely proportional to the length of the sensor laser fiber 5, 5a, 5b, 3.

In addition to measuring isotropic pressures, the fiber laser sensor 1 according to the invention can also be designed for other measured variables. For example, it is also possible to measure anisotropic transverse or longitudinal forces or strains and temperatures. The sensor fiber 5, 5a, 5b is selected to be birefringent and preferably bimodal for the purpose of measuring longitudinal strains and temperatures. In this case, the above-described sensor structures 2 are to be operated such that the measured variable acts on the one-piece sensor fiber 5 or on a segment 5, 5b.

In sum, the invention discloses a frequency-coded fiber laser pressure sensor 1 for measuring preferably isotropic pressures, whose pressure-sensitive sensor element comprises a preferably elongated, rotationally asymmetric sensor fiber 5, 5a, 5b and which is read out in a purely optical fashion, is easy to multiplex, and can be packed in a very compact, lightweight and robust pressure housing 25.

LIST OP REFERENCE SYMBOLS

1 Fiber laser pressure sensor
2 Fiber laser
3 Laser-amplifying fiber, doped fiber
4a, 4b End reflectors, fiber Bragg grating
5, 5a, 5b Birefringent sensor fiber, sensor fiber segments; fibers with elliptical core (single-mode or double-mode)
51 Fiber core
52 Cladding
53 Side holes
6 90° splice
7a–7d Feed fibers
8 Pumped light source, pumping laser
9 Fiber coupler, wavelength division multiplexer
10a–10f Splices
11 Optical isolator
12 Detection unit
13 Polarization controller
14, 14a, 14b Analyzer, fiber polarizer
15 Detector, photodiode
16 Signal line
17 Electronic evaluation system
18 Frequency filter
19 Frequency counter
20 Adder
21a, 21b 0°, 45° splices
22 Polarization-maintaining fiber coupler
23 Wavelength division demultiplexer
24 Multichannel detector
Housing
Opening
27a–27c Pressure chambers, housing compartments
27a, 27b Inner capillaries
28a–28d Pressure-tight fiber feedthroughs
29 Fiber cable
30 Medium
31 Fluid
32 Diaphragm
33 Frequencies of the longitudinal modes
34 Reflection spectra of the Bragg gratings
35 Intermediate fiber
c Speed of light in vacuum
$L_a$, $L_b$, L Length of the sensor fiber segments
$L_d$ Length of the laser-amplifying fiber
$\lambda_B$ Bragg wavelength
$\lambda_1, \ldots, \lambda_i$ Emission wavelengths
v Frequency of the fiber laser
$v_B$ Bragg frequency
$\Delta v_B$, $\Delta v_B^{(1)}$, $\Delta v_B^{(2)}$ Bandwidths of the fiber Bragg gratings
$\Delta v_0$, $\Delta v_0'$ Frequency spacing
$\Delta v_1$ Fundamental bead frequency
$n_d$, $n_a$, $n_a'$, $n_b$, $n_b'$ Effective refractive indices
$\Delta n_a$, $\Delta n_b$ Birefringences
i, m Indices
p Pressure
T Temperature
(Normalized) Bragg reflectivity

What is claimed is:

1. A fiber laser pressure sensor comprising in operative communication:
    a pumped light source;
    feed fibers;
    a fiber laser which has at least two end reflectors, a laser-amplifying fiber, and in addition a sensor fiber, wherein the laser-amplifying fiber and the sensor fiber are disposed between the two end reflectors;
    a detection unit; and
    an electronic evaluation system;
    wherein the sensor fiber has a non-rotationally symmetrical structure, in which sensor fiber all-round pressure thereby induces birefringence and a pressure-proportional beat frequency between different polarization modes or spatial modes.

2. The fiber laser pressure sensor as claimed in claim 1, wherein the sensor fiber
    (a) has an elliptical core, a bow-tie structure, a panda structure, a side-hole structure, a D-shape structure, an elliptical cladding or an partially buffed cladding; and
    (b) is subjected directly as a whole or partially to a pressure to be measured.

3. The fiber laser pressure sensor as claimed in claim 2, wherein
    (a) the sensor fiber carries exactly two polarization modes or exactly two spatial modes,
    (b) the sensor fiber includes exactly two identical fiber segments which are twisted relative to one another by 90° (±30°) or 0° (±30°), and
    (c) in particular, an intermediate fiber is arranged between the fiber segments.

4. The fiber laser pressure sensor as claimed in claim 1, wherein
    (a) the end reflectors are fiber Bragg gratings, and
    (b) a Bragg wavelength $\lambda_B$ is a measure of a temperature.

5. The fiber laser pressure sensor as claimed in claim 1, wherein
    (a) the fiber Bragg gratings are written directly into the laser-amplifying fiber and/or into the sensor fiber, and
    (b) in particular, one of the fiber Bragg gratings is selected with a larger bandwidth.

6. The fiber laser pressure sensor as claimed in claim 5, wherein one bandwidth $\Delta v_B^{(1)}$=0.6 nanometers and another bandwidth $\Delta v_B^{(2)}$=0.2 nanometers.

7. The fiber laser pressure sensor as claimed in claim 1, wherein
    (a) a fiber polarizer is arranged in or near the fiber laser, and
    (b) in particular, the Bragg wavelength $\lambda_B$ is selected in a spectral region of a vanishing group refractive index birefringence of the sensor fiber.

8. The fiber laser pressure sensor as claimed in claim 1, wherein
    (a) the pumped light source, the fiber laser, and the detection unit are optically connected by means of a fiber coupler, (b) the detection unit comprises an analyzer, a detector, and in particular, a polarization controller, and (c) the electronic evaluation system has a frequency filter and a frequency counter.

9. The fiber laser pressure sensor as claimed in claim 8, wherein the fiber coupler is frequency selective.

10. The fiber laser pressure sensor as claimed in claim 1, wherein (a) the pumped light source, the fiber laser, and the detection unit are optically connected by means of a fiber coupler, (b) the detection unit has a polarization maintaining fiber coupler with two analyzers oriented at 0° and 45° and two detectors, and (c) the electronic evaluation system has a frequency filter, a frequency counter, and an adder.

11. The fiber laser pressure sensor as claimed in claim 1, wherein (a) a plurality of fiber lasers of different emission wavelengths are optically connected to a pumped light source and a detection unit, (b) the detection unit has a wavelength division multiplier and a multichannel detector, and (c) the electronic evaluation system is a multichannel electronic evaluation system.

12. The fiber laser pressure sensor as claimed in claim 1, wherein (a) the fiber laser is mounted in a pressure-resistant housing with a plurality of pressure chambers and pressure-tight fiber feedthroughs, and (b) a first pressure chamber which contains a measuring fiber segment of the sensor fiber is in direct pressure exchange with a surrounding medium.

13. The fiber laser pressure sensor as claimed in claim 12, wherein (a) a fiber Bragg grating and the laser amplifying fiber are mounted in a second pressure chamber, and (b) a fiber Bragg grating and a fiber segment of the sensor are mounted in a third pressure chamber, and in particular, the second and third pressure chambers are inner capillaries with pressure-tight fiber feedthroughs.

14. A fiber laser pressure sensor as in claim 1, wherein the sensor fiber is between the laser-amplifying fiber and one of the reflectors.

15. A fiber laser sensor for measuring a variable comprising in operative communication:

a pumped light source;

feed fibers;

a fiber laser which has at least two end reflectors, a laser-amplifying fiber, and in addition a sensor fiber, wherein the laser-amplifying fiber and the sensor fiber are disposed between the two end reflectors;

a detection unit;

an electronic evaluation system;

wherein the sensor fiber carries exactly two spatial modes, and wherein the measured variable acts on the sensor fiber or on a segment of the sensor fiber.

16. A fiber laser sensor comprising in operative communication:

a pumped light source;

feed fibers;

a fiber laser which has at least two end reflectors, a laser-amplifying fiber, and a sensor fiber, wherein the laser-amplifying fiber and the sensor fiber are disposed between the two end reflectors;

a detection unit;

an electronic evaluation system;

wherein the sensor fiber carries exactly two spatial modes, and in which sensor fiber all-round pressure thereby induces birefringence and a pressure-proportional beat frequency between the two spatial modes.

17. A fiber laser pressure sensor comprising in operative communication:

a pumped light source;

feed fibers;

a fiber laser which has at least two end reflectors, a laser-amplifying fiber, and in addition a sensor fiber, wherein the laser-amplifying fiber and the sensor fiber are disposed between the two end reflectors;

a detection unit;

an electronic evaluation system;

wherein the end reflectors are fiber Bragg gratings, the fiber sensor has a non-rotationally symmetrical structure, in which fiber sensor all-round pressure thereby induces birefringence and a pressure-proportional beat frequency between different polarization modes or spatial modes, the fiber laser is mounted in a pressure-resistant housing with a plurality of pressure chambers and pressure-tight fiber feedthroughs, a first pressure chamber, which contains a measuring fiber segment of the sensor fiber, is in direct pressure exchange with a surrounding medium, and one of the fiber Bragg gratings and the laser amplifying fiber are mounted in a second pressure chamber.

\* \* \* \* \*